US012763089B2

(12) United States Patent
Huang et al.

(10) Patent No.: US 12,763,089 B2
(45) Date of Patent: Oct. 13, 2026

(54) SPEECH PROCESSING

(71) Applicant: Tencent Technology (Shenzhen) Company Limited, Shenzhen (CN)

(72) Inventors: Jun Huang, Shenzhen (CN); Yannan Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 112 days.

(21) Appl. No.: 18/658,964

(22) Filed: May 8, 2024

(65) Prior Publication Data

US 2024/0290338 A1 Aug. 29, 2024

Related U.S. Application Data

(63) Continuation of application No. PCT/CN2023/085321, filed on Mar. 31, 2023.

(30) Foreign Application Priority Data

May 7, 2022 (CN) ......................... 202210495197.5

(51) Int. Cl.
*G10L 21/0208* (2013.01)

(52) U.S. Cl.
CPC *G10L 21/0208* (2013.01); *G10L 2021/02082* (2013.01)

(58) Field of Classification Search
CPC ....... G10L 21/0208; G10L 2021/02082; G10L 25/30; G10L 15/02; G10L 15/063
See application file for complete search history.

(56) References Cited

U.S. PATENT DOCUMENTS

| | | | | |
|---|---|---|---|---|
| 12,272,369 | B1 * | 4/2025 | Chhetri | H04M 9/08 |
| 2019/0318754 | A1 * | 10/2019 | Le Roux | G10L 19/06 |
| 2021/0074282 | A1 * | 3/2021 | Borgstrom | G06N 3/0499 |
| 2022/0358904 | A1 * | 11/2022 | Mandel | G10L 13/047 |
| 2024/0161765 | A1 * | 5/2024 | Wojcicki | G06N 3/09 |
| 2025/0131941 | A1 * | 4/2025 | Yang | G10L 25/78 |

FOREIGN PATENT DOCUMENTS

| | | |
|---|---|---|
| JP | 2019-204074 A | 11/2019 |
| JP | 2021-515277 A | 6/2021 |

OTHER PUBLICATIONS

Office Action received for Japanese Patent Application No. 2024-532312, mailed on Jun. 24, 2025, 7 pages (3 pages of English Translation and 4 pages of Original Document).

(Continued)

*Primary Examiner* — Stella L. Woo
(74) *Attorney, Agent, or Firm* — ARENTFOX SCHIFF LLP

(57) ABSTRACT

In an audio processing method, an initial audio feature of initial audio data is obtained. The initial audio feature is input to an audio enhancement model. The audio enhancement model is iteratively trained based on a deep clustering loss function and a mask inference loss function. Target audio data with reduced noise and reverberation is calculated according to a target audio feature. The target audio feature is generated by the audio enhancement model based on the initial audio feature. The target audio data is output.

20 Claims, 8 Drawing Sheets

(56) References Cited

OTHER PUBLICATIONS

Extended European Search Report and Search Opinion received for European Application No. 23802536.5, mailed on Jan. 3, 2025, 9 pages.
Wang et al., "Alternative Objective Functions for Deep Clustering", 2018 IEEE International conference on acoustics, Speech and signal processing (ICASSP), IEEE, XP033401818, Apr. 15, 2018, pp. 686-690.
Office Action received for Japanese Patent Application No. 2024-532312, mailed on Dec. 9, 2025, 10 pages (5 pages of English Translation and 5 pages of Original Document).
Fan et al., "Simultaneous Denoising and Dereverberation Using Deep Embedding Features", arXiv:2004.02420v1 [eess.AS], Apr. 6, 2020, 5 pages.
Office Action received for Chinese Patent Application No. 202210495197.5, mailed on Jun. 4, 2026, 13 pages (6 pages of English Translation and 7 pages of Original Document).

* cited by examiner

SPEECH PROCESSING

RELATED APPLICATIONS

The present application is a continuation of International Application No. PCT/CN2023/085321, filed on Mar. 31, 2023, which claims priority to Chinese Patent Application No. 202210495197.5, filed on May 7, 2022. The entire disclosures of the prior applications are hereby incorporated herein by reference.

FIELD OF THE TECHNOLOGY

This disclosure relates to the field of speech recognition technologies, including to a speech processing method and apparatus, a storage medium, a computer device, and a program product.

BACKGROUND OF THE DISCLOSURE

Speech enhancement includes speech denoising. In daily life, speeches acquired by a microphone include "polluted" speeches with different noise. An objective of speech enhancement is to recover speeches without noise from the "polluted" speeches with noise, to effectively suppress various interference signals and enhance target speech signals. This both improves voice quality of the speeches, and is conducive to improving performance of speech recognition.

Fields to which speech enhancement may be applied include video conferencing, speech recognition, and the like. The speech enhancement may be performed by a preprocessing module in a speech coding and recognition system, and may be divided into near-field speech enhancement and far-field speech enhancement. In a complex speech acquisition environment, since noise and reverberation exist at the same time, related speech enhancement uses a denoising and dereverberation solution based on two levels of networks. However, a large calculation amount of the two levels of networks may make it difficult for the speech enhancement to meet performance requirements of actual applications.

SUMMARY

Aspects of this disclosure include an audio processing method and apparatus, a non-transitory computer-readable storage medium, a computer device, and a program product, to improve performance of audio enhancement. The audio corresponds to speech for example.

An aspect of this disclosure provides a audio processing method. In the method, an initial audio feature of initial audio data is obtained. The initial audio feature is input to an audio enhancement model. The audio enhancement model is iteratively trained based on a deep clustering loss function and a mask inference loss function. Target audio data with reduced noise and reverberation are calculated by processing circuitry according to a target audio feature. The target audio feature is generated by the audio enhancement model based on the initial audio feature. The target audio data is output . . . .

An aspect of this disclosure further provides an information processing apparatus, including processing circuitry configured to obtain an initial audio feature of initial audio data. The processing circuitry is configured to input the initial audio feature to an audio enhancement model. The audio enhancement model is iteratively trained based on a deep clustering loss function and a mask inference loss function. The processing circuitry is configured to calculate target audio data with reduced noise and reverberation according to a target audio feature. The target audio feature is generated by the audio enhancement model based on the initial audio feature. The processing circuitry is configured to output the target audio.

An aspect of this disclosure further provides a computer device. The computer device includes a processor and a memory. The memory stores computer program instructions. The computer program instructions, when invoked by the processor, perform the speech processing method.

An aspect of this disclosure further provides a non-transitory computer-readable storage medium. The non-transitory computer-readable storage medium stores instructions which when executed by a processor cause the processor to perform the speech processing method.

An aspect of this disclosure further provides a computer program product or a computer program. The computer program product or the computer program includes computer instructions. The computer instructions are stored in a storage medium. A processor of a computer device reads the computer instructions from the storage medium, and the processor executes the computer instructions, to cause the computer to perform steps of the speech processing method.

In an aspect of this disclosure, two different loss functions are used to perform model training iteratively on a preset speech enhancement model, and the model is guided to efficiently remove noise and reverberation in a speech feature, causing a denoising task and a dereverberation task to implement an optimal training effect in respective training processes, so that it is conducive to improving capabilities of denoising and dereverberation of the speech enhancement model. While computing resources of a model are reduced, the performance of the speech enhancement is improved.

BRIEF DESCRIPTION OF THE DRAWINGS

To describe the technical solutions in aspects of this disclosure more clearly, the following briefly describes the accompanying drawings. The accompanying drawings in the following description show only some aspects of this disclosure. Other aspects are within the scope of the present disclosure.

DETAILED DESCRIPTION

The following describes in further detail implementations of this disclosure. Examples of the implementations are shown in the accompanying drawings, where reference signs that are the same or similar from beginning to end represent same or similar components or components that have same or similar functions. The following implementations described with reference to the accompanying drawings are examples, which are used merely to explain this disclosure, and are not intended to the scope of this disclosure. Other variations and aspects shall fall within the scope of this disclosure.

In daily life, a problem of voice communication under noise interference is often encountered, for example, noise of an environment during use of mobile phones in cars and trains, and noisy far-end speech acquired by a microphone during multi-people video conferencing. Therefore, it is necessary to use a speech enhancement technology to extract an original speech as pure as possible from noisy speech signals. According to different call scenarios, a type of call that a user makes using a client may include a near-end call and a far-end call. In terms of call participants, a near-end is a location of a participant, and a far-end is a location of other participants in a teleconference. There are at least one microphone and speaker at each location. However, the near-end call of the client is suitable for short-distance calls with a single person or a small number of people, and audio and video experience is mediocre.

Figure 1:
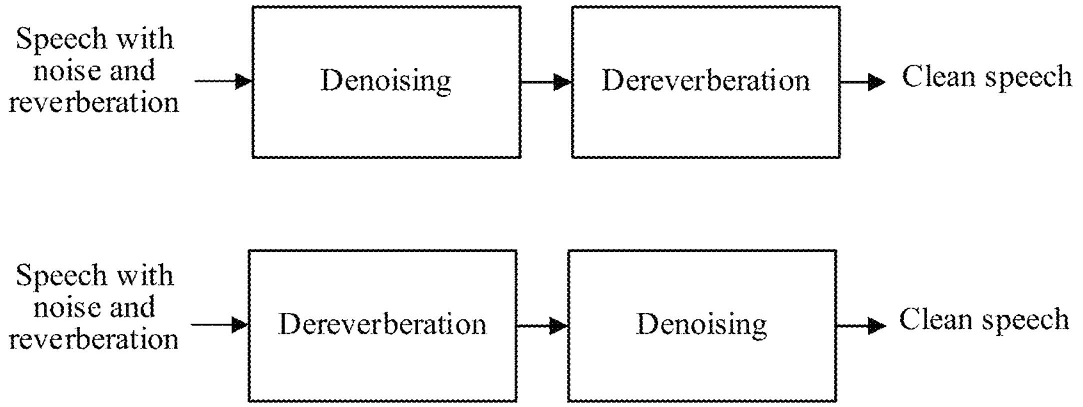
FIG. 1 is a schematic diagram of a related method for denoising and dereverberation according to an aspect of this disclosure.

To improve user experience, the industry focuses on a study of far-end calls under large-screen communication devices. However, since far-end calls have a longer call distance and a lower signal-to-noise ratio, and a call speech is usually accompanied by noise and reverberation, it is necessary to utilize far-field speech enhancement with better performance for denoising and dereverberation on the call speech. Speech enhancement solutions in the related art usually use two models for denoising and dereverberation respectively. For a speech with noise and reverberation, referring to FIG. 1, FIG. 1 shows two related solutions for denoising and dereverberation, including denoising followed by dereverberation or dereverberation followed by denoising.

For example, a microphone array is divided into different subsets. Each subset obtains an enhanced speech of each microphone through a first-level speech enhancement network, and enhanced speeches are integrated together and then enhanced by a second-level speech enhancement network, to obtain a final output. However, in such a speech enhancement solution based on two levels of networks, a large calculation amount is required in a training process, which is not suitable for performance requirements of actual application of a product. If a number of network parameters is reduced to reduce a calculation amount, it leads to deterioration of an effect of the network performing speech enhancement.

To resolve the above problem, the applicant, after research, proposes a speech processing method provided in the aspects of this disclosure. In the method, an initial audio/speech feature of a call may be obtained, and the initial audio/speech feature is inputted to a pre-trained audio/speech enhancement model to obtain a target audio/speech feature outputted by the speech enhancement model. The audio/speech enhancement model is obtained through step training based on a deep clustering loss function and a mask inference loss function, so that two models (two levels of networks) are merged into a same model, reducing calculation costs in a model training process. A target audio/speech with reduced noise and reverberation is calculated according to the target speech feature. In this way, different loss functions are used to perform model training on a preset speech enhancement model, to guide the model to efficiently remove noise and reverberation in the initial speech feature. Therefore, while computing resources of a model are reduced, the performance of speech enhancement is improved.

Figure 2:
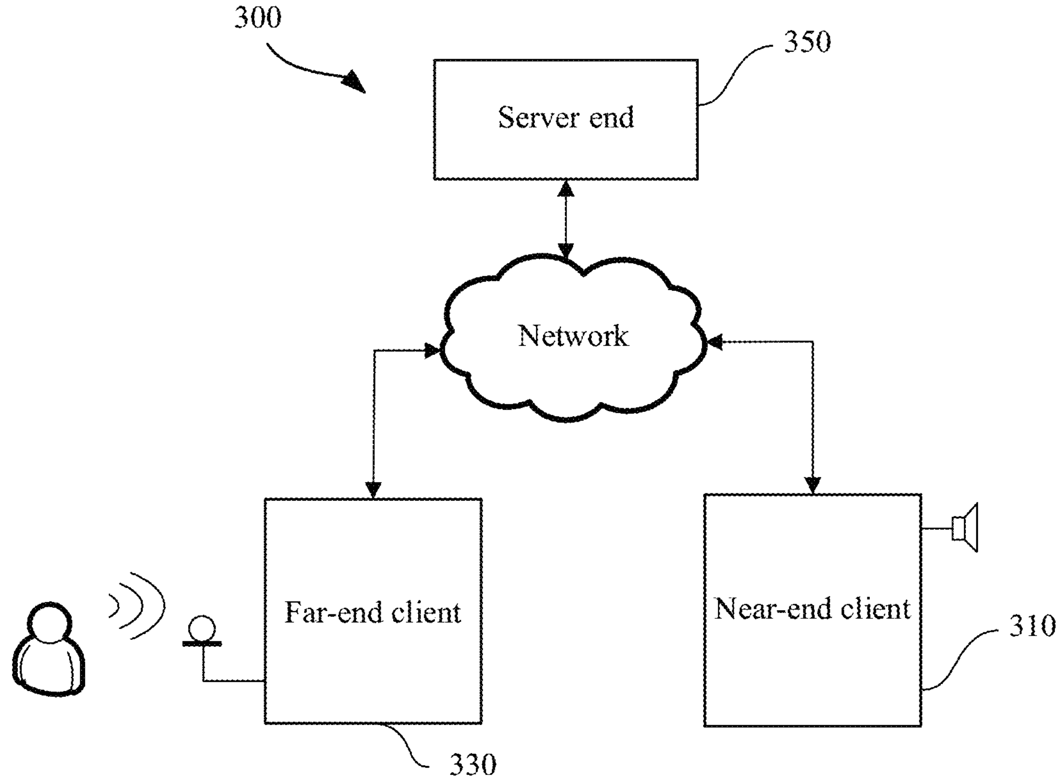
FIG. 2 is a schematic diagram of an architecture of a speech processing system according to an aspect of this disclosure.

An application scenario of the speech processing method related to this disclosure is first described below. FIG. 2 is a schematic diagram of an architecture of a speech processing system. In some aspects, a speech processing system 300 is used in a remote video conference scenario. The speech processing system 300 may include a near-end client 310, a far-end client 330, and a server end 350. The near-end client 310, the far-end client 330, and the server end 350 are communicatively connected through a network. In an implementation, the near-end client 310 and the far-end client 330 may be large-screen terminals configured for video chatting, and the server end 350 may be a cloud server.

For example, the far-end client 330 may acquire an initial speech with noise and reverberation generated by a participant, and transmits the initial speech to the server end 350. After receiving the initial speech, the server end 350 may perform denoising and dereverberation on the initial speech by using a pre-trained speech enhancement model, to obtain an enhanced clean speech (a target speech), and transmit the clean speech to the near-end client 310. In some aspects, the speech enhancement model may alternatively be configured in the near-end client 310 or the far-end client 330 according to requirements of actual application scenarios.

The speech processing system 300 is one of the examples. An architecture and an application scenario of the speech processing system described in this aspect of this disclosure are intended to describe the technical solutions in the aspects of this disclosure more clearly, and do not constitute a limitation to the technical solutions provided in the aspects of this disclosure. A person of ordinary skill in the art may learn that, with evolution of the architecture of the speech processing system and emergence of a new application scenario, the technical solutions provided in the aspects of this disclosure are also applicable to similar technical problems.

Figure 3:
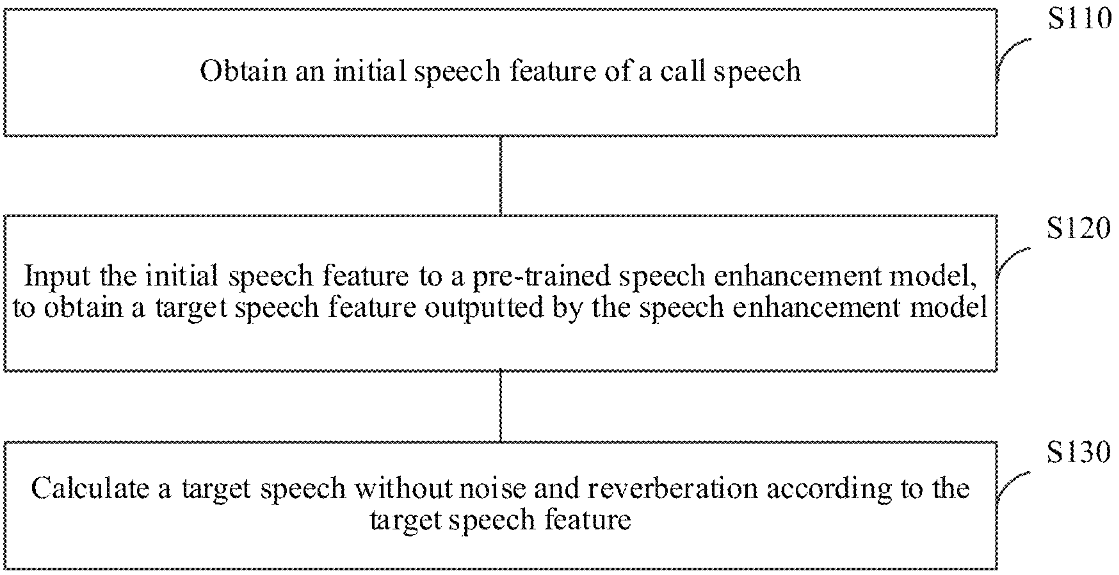
FIG. 3 is a schematic flowchart of a speech processing method according to an aspect of this disclosure.

FIG. 3 is a schematic flowchart of a speech processing method according to an aspect of this disclosure. In a specific aspect, the speech processing method is applied to a speech processing apparatus 500 shown in FIG. 9 and a computer device 600 (FIG. 10) in which the speech processing apparatus 500 is configured.

A computer device is used as an example below to describe a specific procedure of this aspect of this disclosure. Certainly, the computer device used in this aspect of this disclosure may be a server, a terminal, or the like. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a CDN, a blockchain, big data, and an artificial intelligence platform. The terminal may be a smartphone, a tablet computer, a notebook computer, a desktop computer, a smart speaker, a smartwatch, or the like, but is not limited thereto.

Figure 4:
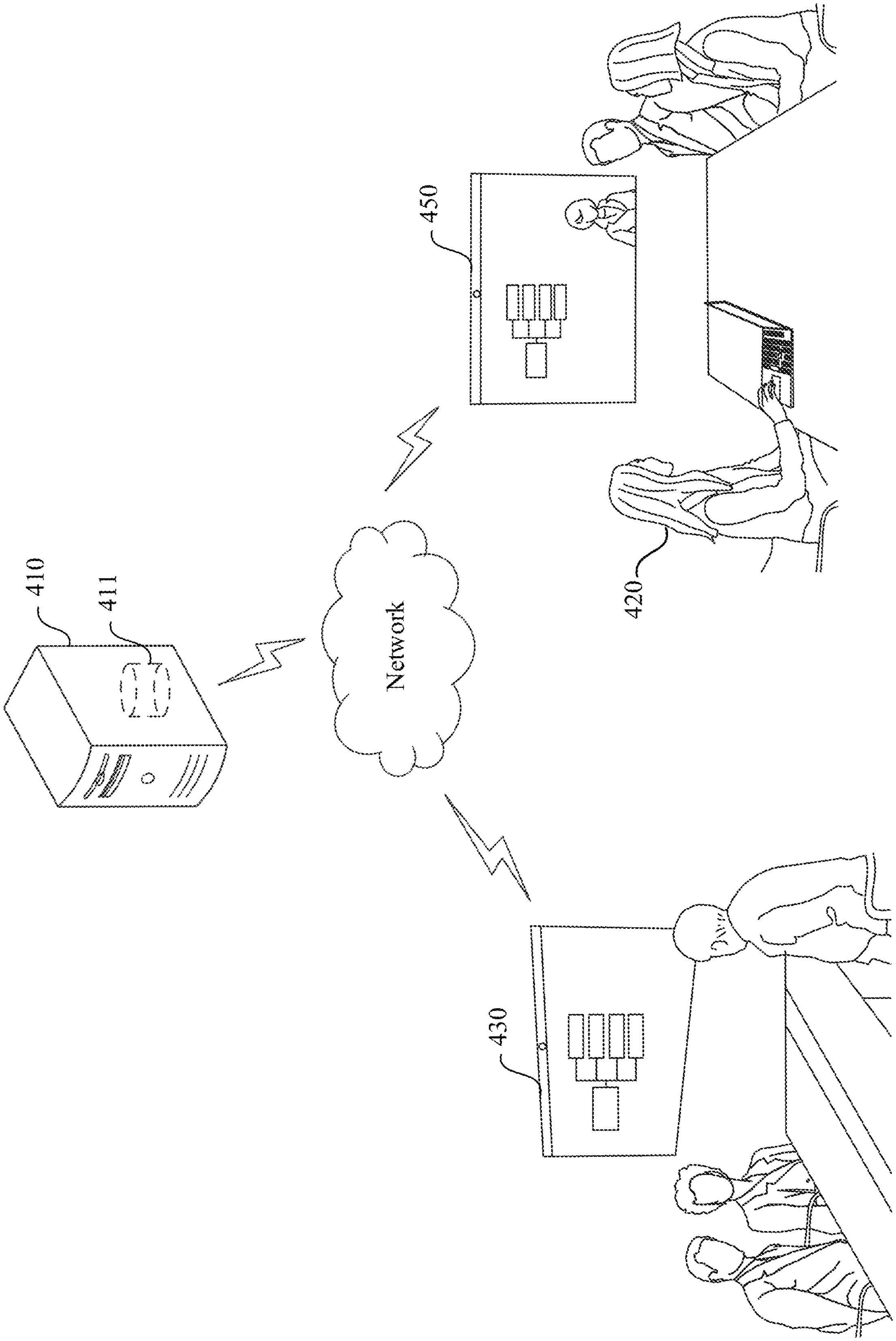
FIG. 4 is a schematic diagram of an application scenario of a speech processing method according to an aspect of this disclosure.

The following describes the procedure shown in FIG. 3 with reference to an application scenario shown in FIG. 4. FIG. 4 is a schematic diagram of an application scenario of a speech processing method according to an aspect of this disclosure. In this application scenario, the speech processing method may be applied to a specific speech enhancement system. A speech enhancement model 411 of the speech enhancement system may be deployed in a cloud server 410. The cloud server 410 may be communicatively connected to conference terminals (a first conference terminal 430 and a second conference terminal 450) in two conferences respectively. The first conference terminal 430 and the second conference terminal 450 may acquire speeches (that is, original call speeches) of participants of respective conferences, and upload the acquired speeches to the cloud server 410. The cloud server 410 performs speech enhancement on the speech to obtain clean speeches. Finally, the cloud server 410 transmits the clean speeches to corresponding conference terminals for playback. The speech processing method may specifically include the following steps.

Step S110: Obtain an initial speech feature of a call speech. In some aspects, step S110 is not limited to speech. For example, an initial audio feature of initial audio data may be obtained.

In this aspect of this disclosure, the computer device may obtain an initial speech feature of a call speech on which speech enhancement needs to be performed. The initial speech feature is an acoustic feature obtained through conversion based on the call speech, for example, a logarithmic power spectrum (LPS) and Mel-frequency cepstral coefficients (MFCC), which is not limited herein.

Because speech data often cannot be directly inputted to a model for training like image data, and does not have apparent feature changes in a long time domain, it is difficult to learn features of the speech data. In addition, time domain data of a speech is usually formed at a sampling rate of 16K, that is, 16,000 sampling points in 1 second, and if time domain sampling points are directly inputted, it leads to an excessively large amount of data for training and it is difficult to achieve an effect of practical significance through training. Therefore, in speech processing related tasks, it converts speech data into acoustic features as an input or an output of a model.

In an implementation, after obtaining the call speech, framing processing and windowing processing may be performed on the call speech, to obtain the initial speech feature. For example, frame processing and windowing processing are performed on call speeches acquired by all microphones in sequence, to obtain speech signal frames of the call speeches, fast Fourier transformation (FFT) is performed on the speech signal frames, a discrete power spectrum after the FFT is calculated, and then logarithmic calculation is performed on the obtained discrete power spectrum, to obtain a logarithmic power spectrum as the initial speech feature. By performing framing processing and windowing processing on a call speech, the call speech can be converted from non-smooth time-varying signals in a time domain space into smooth signals in a frequency domain space, facilitating model training.

An objective of framing processing on a speech signal is to divide several speech sampling points into one frame, and in the frame, a property of the speech signal may be considered as stable. Generally, a length of one frame needs to be short enough to ensure that an intra-frame signal is smooth. Therefore, the length of one frame needs to be less than a length of a phoneme, and duration of one phoneme is approximately 50 ms at a normal speech rate. In addition, to perform Fourier analysis, one frame needs to include a sufficient number of vibration periods, namely, around 100 Hz for male voices and 200 Hz for female voices, which are 10 ms and 5 ms when converted into periods. Therefore, generally, a length of a speech frame ranges from 10 ms to 40 ms.

After framing processing, there are discontinuities at the beginning and end of each frame. Therefore, a larger number of frames obtained through division indicates a larger error with an original signal. Windowing is to resolve this problem and make the framed signals continuous, and each frame shows properties of a periodic function. For example, window functions that can be used include: a rectangular window, a Hamming window, a Hanning window, and the like.

In the video conference scenario shown in FIG. 4, since there is a distance between the participants and the conference terminal, speeches of the participants acquired by the conference terminal has noise and reverberation. Therefore, the speech processing method provided in this aspect of this disclosure may be used to perform speech enhancement on the speeches of the participants, to remove the noise and the reverberation in the speeches.

For example, the second conference terminal 450 acquires a speech, that is, a call speech, of a participant 420 by a microphone in the conference, and sends the call speech to the cloud server 410 by a network. Then, after receiving the call speech, the cloud server 410 performs framing processing, windowing processing, and Fourier transform on the call speech, to obtain an initial speech feature.

Step S120: Input the initial speech feature to a pre-trained speech enhancement model, to obtain a target speech feature outputted by the speech enhancement model. In some aspects, step S120 is not limited to speech. For example, the initial audio feature is input to an audio enhancement model, the audio enhancement model being iteratively trained based on a deep clustering loss function and a mask inference loss function.

In an actual application scenario, the call speech acquired by the microphone array includes both noise and reverberation. Considering that two levels of networks configured to perform denoising and dereverberation on the call speech have a large quantity of parameters during training of the two networks, a large quantity of computing resources need to be consumed. In addition, if the quantity of parameters of each network is reduced, performance of the model performing denoising and dereverberation is also reduced. Therefore, the two levels of networks may be merged into a same network. Compared with the quantity of parameters of the two networks, a quantity of parameters of the merged model is reduced, so that a calculation amount in a training process can be greatly reduced, and the performance of the model performing speech enhancement can also be improved.

Figure 5:
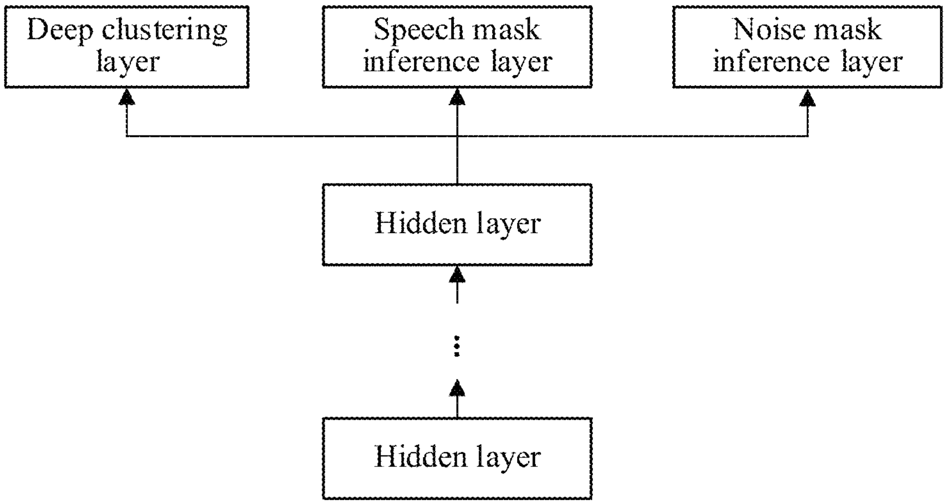
FIG. 5 is a schematic diagram of an architecture of a speech enhancement model according to an aspect of this disclosure.

In this aspect of this disclosure, the speech enhancement model may generate a target speech feature corresponding to the call speech based on the inputted initial speech feature, that is, a clean speech feature without noise and reverberation after the speech enhancement. FIG. 5 is a schematic diagram of an architecture of a speech enhancement model. The speech enhancement model may include a plurality of hidden layers, a deep clustering layer, a speech mask inference layer, and a noise mask inference layer.

The deep clustering layer, the speech mask inference layer, and the noise mask inference layer may be linear layers, and all inputs of the three layers come from an output of the hidden layer. The hidden layer may calculate an intermediate feature based on the inputted initial speech feature, and the intermediate feature is an intermediate value in a speech enhancement process.

For example, the deep clustering layer may be implemented through normalization and a tangent function (denoted as tan h). Normalization processing is first performed on the output of the hidden layer, the output of the hidden layer is limited to a specific range for subsequent processing, for example, [0,1] or [−1,1], and then a tangent function value is calculated for the normalized result and used as an output of the deep clustering layer.

For example, the speech mask inference layer and the noise mask inference layer can be both implemented by using a softmax function.

The speech mask inference layer may perform mask inference (MI) based on the intermediate feature, to obtain a target speech feature without noise and the reverberation. The noise mask inference layer may perform mask inference based on the intermediate feature, to obtain a speech feature with noise. The deep clustering layer performs deep clustering (DC) on the obtained intermediate feature, to assist the speech mask inference layer and the noise mask inference layer in denoising and dereverberation. For example, the hidden layer may be a Long Short-Term Memory (LSTM) or a variant thereof, for example, a Bi-directional Long Short-Term Memory (Bi-LSTM), because a speech feature has a short-term stationary time series, which is consistent with a long short-term memory capability of the LSTM. The hidden layer may alternatively be another network with a memory property, for example, a gated recurrent unit (GRU).

In an implementation, in a model training process, step training may be performed on the model by using a deep clustering loss function corresponding to the deep clustering layer and mask inference loss functions respectively corresponding to the speech mask inference layer and the noise mask inference layer. For example, in step 1, a denoising model may be trained based on the deep clustering loss function and the mask inference loss function, and after the denoising model converges, the training is stopped. The mask inference loss function corresponding to the speech mask inference layer uses a clean speech label without noise and with reverberation. In step 2, a dereverberation model is trained. The denoising model trained in step 1 is used as the dereverberation model. The dereverberation model is trained based on the deep clustering loss function and the mask inference loss function, and after the dereverberation model converges, the training is stopped. The mask inference loss function corresponding to the speech mask inference layer uses a clean speech label without noise and reverberation. Therefore, a finally obtained dereverberation model, that is, the speech enhancement model, has a capability of performing both denoising and dereverberation.

The deep clustering layer of the speech enhancement model is a binary loss based on time-frequency point clustering. Due to a regularization property of a depth clustering loss, in a training process in the related technology, it is difficult to guide the speech mask inference layer and the noise mask inference layer to effectively remove noise and reverberation in a speech, and consequently, it is difficult to effectively improve performance of the model performing speech enhancement. However, in a step training solution in this aspect of this disclosure, a denoising task and a dereverberation task can achieve an optimal training effect in respective training processes, thereby helping improve a capability of the speech enhancement model performing denoising and dereverberation.

In this way, by using the speech enhancement model obtained by training, an intermediate feature may be obtained through a plurality of layers of LSTM. The speech mask inference layer may perform mask inference based on the intermediate feature, to calculate a mask of the speech, that is, the target speech feature. For example, in the video conference scenario shown in FIG. 4, after obtaining the initial speech feature, the cloud server 410 may input the initial speech feature to the speech enhancement model 411. A speech mask inference layer of the speech enhancement model 411 may perform mask inference based on an intermediate feature, to calculate a mask of a speech, that is, a target speech feature. The intermediate feature is obtained by using a plurality of layers of LSTM. In an application scenario of speech enhancement, because a speech is restored by using the target speech feature outputted by the speech mask inference layer, a calculation amount in a speech enhancement process can be effectively reduced.

Step S130: Calculate a target speech without noise and reverberation according to the target speech feature. In some aspects, step S130 is not limited to speech. For example, target audio data with reduced noise and reverberation is calculated by processing circuitry according to a target audio feature. The target audio feature may be generated by the audio enhancement model based on the initial audio feature.

In an implementation, feature inverse transformation may be performed on the obtained target speech feature, to calculate the target speech without noise and reverberation. For example, inverse Fourier transform (IFT) may be performed on the target speech feature, to transform the target speech feature from a frequency domain to a time domain, to obtain a time domain speech after speech enhancement, that is, a target speech. For example, in the video conference scenario shown in FIG. 4, after obtaining the target speech feature outputted by the speech enhancement model 411, the cloud server 410 may transform the target speech feature, that is, a clean speech feature, into a target speech through Inverse Fourier Transform, to obtain a clean speech without noise and reverberation. The cloud server 410 may send the clean speech to the first conference terminal 430, and a speaker of the first conference terminal 430 plays the speech without noise and reverberation of the participant 420.

In this aspect of this disclosure, an initial speech feature of a call speech may be obtained, and the initial speech feature is inputted to a pre-trained speech enhancement model, to obtain a target speech feature outputted by the speech enhancement model. The speech enhancement model is obtained through step training based on a deep clustering loss function and a mask inference loss function. A target speech with reduced noise and reverberation is calculated and outputted according to the target speech feature. Therefore, different loss functions are used to perform model training on a preset speech enhancement model, to guide the model to efficiently remove noise and reverberation in the initial speech feature, so that while computing resources of a model are reduced, the performance of speech enhancement is improved.

With reference to the method described in the foregoing aspects, the following further provides detailed description by using examples.

In this aspect of this disclosure, an example in which the speech processing apparatus is specifically integrated in a computer device is used for description.

Figure 6:
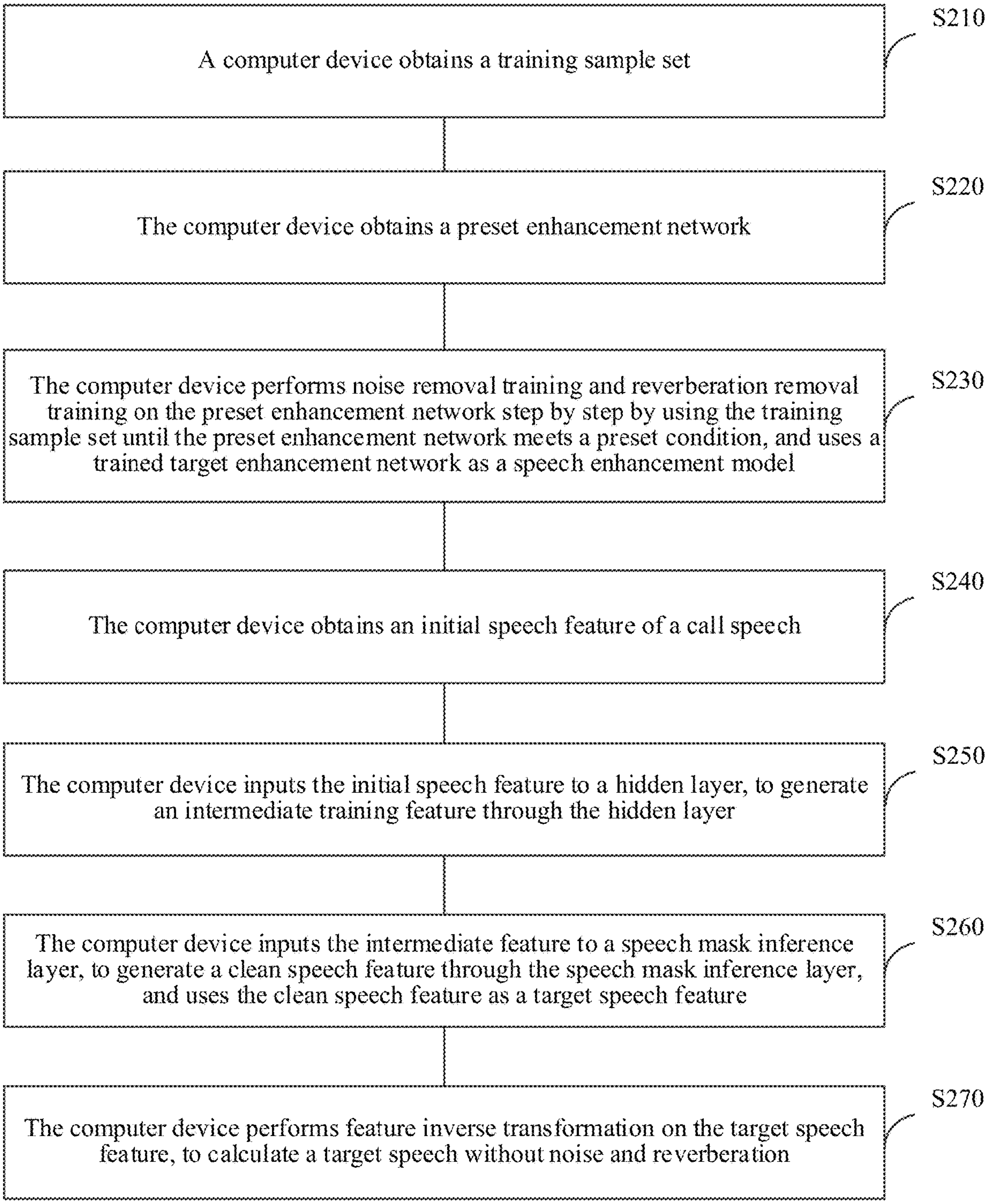
FIG. 6 is a schematic flowchart of another speech processing method according to an aspect of this disclosure.
Figure 8:
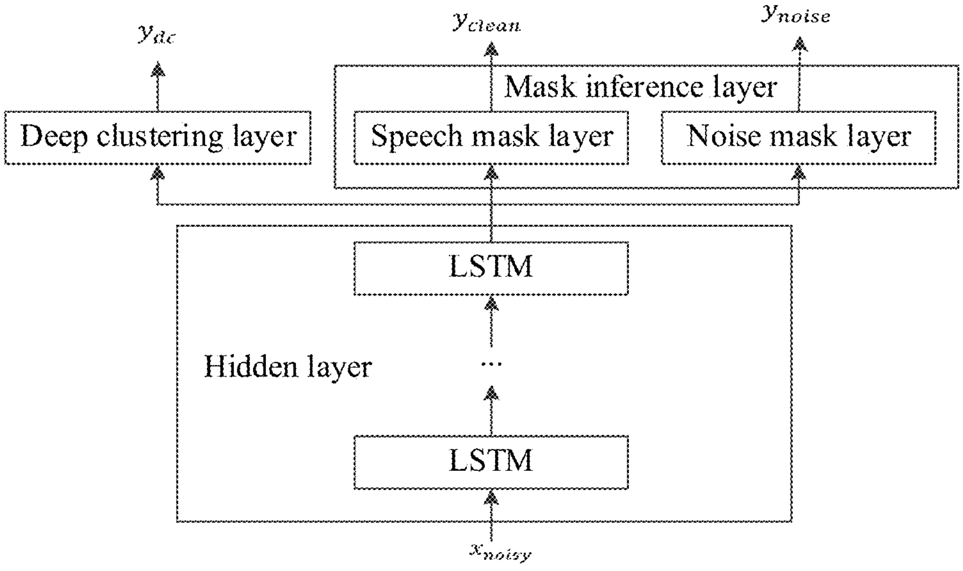
FIG. 8 is a schematic diagram of an architecture of a preset enhancement network according to an aspect of this disclosure.

FIG. 6 is a schematic flowchart of another speech processing method according to an aspect of this disclosure. In a specific aspect, the speech processing method uses a preset enhancement network as shown in FIG. 8. The following describes in detail the procedure shown in FIG. 5.

In this aspect of this disclosure, Artificial intelligence (AI) is used. AI is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

The AI technology is a comprehensive subject, relating to a wide range of fields, and involving both hardware and software techniques. Basic AI technologies generally include technologies such as a sensor, a dedicated AI chip, cloud computing, distributed storage, a big data processing technology, an operating/interaction system, and electromechanical integration. An AI software technology mainly includes fields such as a computer vision (CV) technology, a speech processing technology, a natural language processing technology, and machine learning/deep learning (DL).

The solutions provided in the aspects of this disclosure relate to technologies such as an AI speech technology. Key technologies of the speech technology include an automatic speech recognition (ASR) technology, a text-to-speech (TTS) technology, and a voiceprint recognition (VPR) technology. To make a computer capable of listening, seeing, speaking, and feeling is the future development direction of human-computer interaction, and speech has become one of the most promising human-computer interaction methods in the future.

The following describes in detail with reference to the procedure shown in FIG. 6 and a network architecture diagram shown in FIG. 8. The speech processing method may specifically include the following steps.

Step S210: A computer device obtains a training sample set.

The speech processing method provided in this aspect of this disclosure includes training of a preset enhancement network. The training of the preset enhancement network may be pre-performed according to obtained training sample data. Subsequently, each time speech enhancement needs to be performed on an initial speech feature of a call speech, a target speech feature without noise and reverberation may be calculated by using a speech enhancement model obtained through training without a need to train the preset enhancement network again each time speech enhancement is performed.

In some aspects, a wsj0-2mix (Wall Street Journal) dataset may be used for determining the training sample set. The wsj0-2mix dataset includes a speech training set of 30 hours and a speech training set of 10 hours. Speeches of different speakers are randomly selected from corresponding sets and merged at a random relative signal-to-noise ratio (SNR) between 0 dB to 10 dB, to generate a speech with noise and reverberation configured for network training.

In an implementation, the step that the computer device obtains a training sample set may include:

(1) The computer device obtains a first sample speech.

(2) The computer device performs speech feature extraction on the first sample speech, to obtain a noise speech feature.

(3) The computer device obtains a second sample speech.

(4) The computer device performs speech feature extraction on the second sample speech, to obtain a first clean speech label and a second clean speech label.

(5) The computer device determines a deep clustering annotation according to the first sample speech and the second sample speech.

The first sample speech is a speech with noise and reverberation that is acquired based on a microphone. The second sample speech includes a clean speech without noise and with reverberation and a clean speech without noise and reverberation. The deep clustering annotation is a ratio of features of the first sample speech and the second sample speech at each time-frequency point.

For example, the computer device may directly acquire a call speech with noise and reverberation by using the microphone. For example, during a video conference, a speech of a participant acquired by a microphone of a large-screen conference terminal is used as the first sample speech. In an actual training process, a technician may directly obtain the first sample speech from a denoising training corpus that is already constructed.

Figure 7:
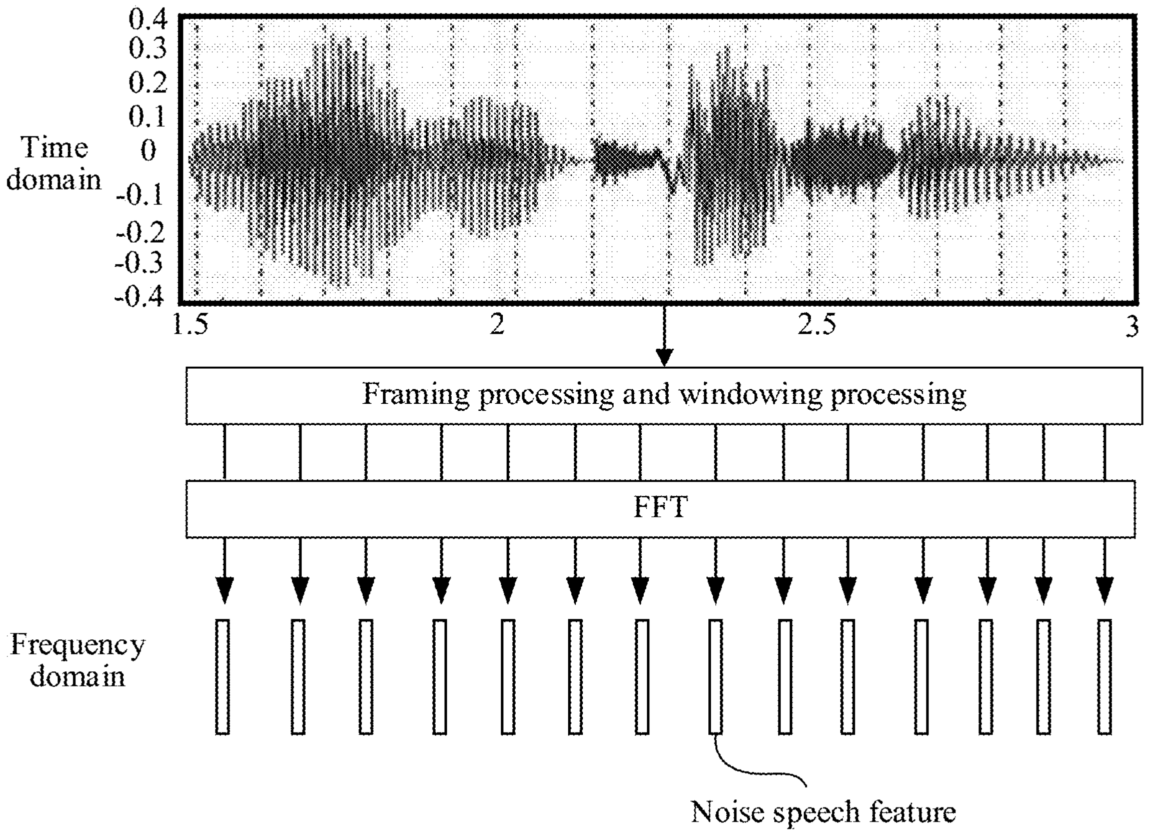
FIG. 7 is a schematic flowchart of voice feature extraction according to an aspect of this disclosure.

The computer device may perform speech feature extraction on the obtained first sample speech. FIG. 7 is a schematic flowchart of speech feature extraction. Framing processing and windowing processing are respectively performed on a call speech with noise and reverberation, that is, a first sample speech $\overline{X}$, acquired by each microphone, to obtain a plurality of frames of speech signals $$x_t^i,$$

where 0<i<n & i∈N*, n is a total frame number, t indicates a time domain space, and N* indicates a set of positive integers. The computer device may further perform FFT on each frame of speech signal, to transform each frame of speech signal from the time domain space into a frequency domain space, to obtain a corresponding discrete power spectrum. In addition, logarithmic calculation is performed on the obtained discrete power spectrum, to obtain a logarithmic power spectrum $$x_f^i,$$

where f indicates the frequency domain space. Features of all microphones are spliced together to obtain a final noise speech feature $x_{noisy}$. In some aspects, a noise speech label may be marked according to the noise speech feature, that is, $$\tilde{Y}_f = \{\tilde{y}_f^1, \tilde{y}_f^2, \ldots, \tilde{y}_f^n\},$$

where $$\tilde{y}_f^1, \tilde{y}_f^2, \ldots, \tilde{y}_f^n$$

are respectively FFT transform results of speech signals from the first frame to the $n^{th}$ frame.

The computer device may alternatively obtain a clean speech as reference from the denoising training corpus, and use the clean speech as the second sample speech. For convenience of performing step training on the preset enhancement network, a clean speech without noise and with reverberation and a clean speech without noise and reverberation may be obtained. Further, speech feature extraction is performed on the clean speech without noise and with reverberation, to obtain a first clean speech label; and speech feature extraction is performed on the clean speech without noise and without reverberation, to obtain a second clean speech label. In a calculation process, mathematical representations of the noise speech label $\tilde{y}_{noise}$, the first clean speech label $$\tilde{y}'_{clean},$$

and the second clean speech label $$\tilde{y}''_{clean}$$

are feature vectors (Embedding), or may also be referred to as embedding vectors. A length of the feature vector is a dimension of a feature.

In an implementation, the computer device may determine a deep clustering annotation $\tilde{y}_{dc}$ by comparing speech energy of the first sample speech and the second sample speech at each time-frequency point. Because the speech signal changes with time, energy of the speech signal also changes with time. Therefore, when energy of a digitized speech signal is calculated, energy at each time-frequency point is calculated frame-by-frame rather than overall energy. For example, the computer device may use an energy ratio of the speech without noise and with reverberation to a noise speech as the deep clustering annotation, or may use an energy ratio of the speech without noise and reverberation to a noise speech as the deep clustering annotation. The deep clustering annotation is configured for calculating a deep clustering loss function.

Step S220: The computer device obtains a preset enhancement network.

Considering that products related to the speech enhancement technology have very strict requirements on a delay, that is, real-time performance, when industrialized and landed, it is necessary to reduce a quantity of parameters of the speech enhancement model as much as possible, but this leads to a significant decrease in an effect of the model performing speech enhancement. Therefore, in this aspect of this disclosure, it is provided to merge two levels of networks into a same network, so that the speech enhancement model can perform denoising and dereverberation at the same time. In this way, in a case that the quantity of parameters of the model is not reduced, the effect of speech enhancement can still be improved.

FIG. 8 is a schematic diagram of an architecture of a preset enhancement network. The preset enhancement network includes a hidden layer, a deep clustering layer, and a mask inference layer. The preset enhancement network is a network with a shared bottom-layer weight and multi-headed outputs. The deep clustering layer may assist the speech mask inference layer and the noise mask inference layer in performing mask inference, so that the speech mask inference layer and the noise mask inference layer can effectively distinguish noise and reverberation from a speech in a network training process, and the hidden layer may use an LSTM or a Bi-LSTM. The hidden layer shown in FIG. 8 is an LSTM, and the mask inference layer includes a speech mask layer (Clean-MI) and a noise mask layer (Noise-MI).

The speech mask inference layer may calculate a mask of a speech, that is, a clean speech label, and the noise mask inference layer may calculate a mask of noise and reverberation, that is, a noise speech label. During application, a speech is restored by using a mask outputted by the speech mask inference layer. Therefore, a calculation amount in a speech enhancement process is not increased, so that efficiency of speech enhancement is improved.

Step S230: The computer device performs noise removal training and reverberation removal training on the preset enhancement network step by step by using the training sample set until the preset enhancement network meets a preset condition, and uses a trained target enhancement network as a speech enhancement model.

The target enhancement network obtained after training, that is, the speech enhancement model, needs to perform two enhancement tasks, denoising and dereverberation, at the same time. If the two enhancement tasks are trained at the same time, training of the preset enhancement network cannot achieve an optimal training effect. Therefore, step training may be performed, to separately perform training processes of the two tasks.

Specifically, the aspects of this disclosure provide two manners of step training, for example, noise removal training may be first performed, and then reverberation removal training is performed; or reverberation removal training may be first performed, and then noise removal training is performed. An objective of the noise removal training is to equip the network with a denoising capability, and an objective of the reverberation removal training is to equip the network with a dereverberation capability. The two enhancement tasks may achieve an optimal training effect in respective training processes, thereby improving performance of the speech enhancement model performing speech enhancement.

In some aspects, the step that the computer device performs noise removal training and reverberation removal training on the preset enhancement network step by step by using the training sample set until the preset enhancement network meets a preset condition may include:

(1) The computer device inputs the noise speech feature to the hidden layer, to generate an intermediate training feature through the hidden layer.

(2) The computer device inputs the intermediate training feature to the deep clustering layer, to generate a clustering training annotation through the deep clustering layer.

(3) The computer device inputs the intermediate training feature to the speech mask inference layer, to generate a clean speech training feature through the speech mask inference layer.

(4) The computer device inputs the intermediate training feature to the noise mask inference layer, to generate a noise speech training feature through the noise mask inference layer.

(5) The computer device constructs a target loss function according to the clean speech label, the noise speech label, the deep clustering annotation, the clean speech training feature, the noise speech training feature, and the clustering training annotation, and performs the noise removal training and the reverberation removal training on the preset enhancement network step by step according to the target loss function until the preset enhancement network meets the preset condition.

The intermediate training feature is an intermediate value generated by the hidden layer of the preset enhancement network, and may be used as a shared value respectively inputted to the deep clustering layer, the speech mask inference layer, and the noise mask inference layer, so that a bottom-layer weight is shared to reduce a quantity of parameters of the network. The speech mask inference layer and the noise mask inference layer may respectively generate a clean speech training feature $y_{clean}$ and a noise speech training feature $y_{noise}$ based on the intermediate training feature. The deep clustering layer may generate a clustering training annotation $y_{dc}$ based on the intermediate training feature.

In an implementation, the step that the computer device constructs a target loss function according to the clean speech label, the noise speech label, the deep clustering annotation, the clean speech training feature, the noise speech training feature, and the clustering training annotation, and performs the noise removal training and the reverberation removal training on the preset enhancement network step by step according to the target loss function until the preset enhancement network meets the preset condition may include:

(5.1) The computer device determines a first loss function according to the clustering training annotation and the deep clustering annotation.

The first loss function is a deep clustering loss function, for example, the first loss function is $Loss_{dc}(y_{dc}, \tilde{y}_{dc})$, where $y_{dc}$ is the clustering training annotation, and $\tilde{y}_{dc}$ is the deep clustering annotation.

(5.2) The computer device determines a second loss function according to the clean speech training feature and the clean speech label.

For the two step training manners, two types of different second loss functions may be determined according to different clean speech labels.

In some aspects, the computer device may determine a noise removal loss function $$Loss_{clean}(y_{clean}, \tilde{y}'_{clean})$$

according to the clean speech training feature $y_{clean}$ and the first clean speech label $\tilde{y}_{clean}'$, and use the noise removal loss function as a second loss function $Loss_{clean}(y_{clean}, \tilde{y}_{clean})$.

In some aspects, the computer device may determine a noise removal loss function $$Loss_{clean}(y_{clean}, \tilde{y}''_{clean})$$

according to the clean speech training feature $y_{clean}$ and the second clean speech label $$\tilde{y}''_{clean},$$

and use the noise removal loss function as a second loss function $Loss_{clean}(y_{clean}, \tilde{y}_{clean})$.

(5.3) The computer device determines a third loss function according to the noise speech training feature and the noise speech label.

For example, the third loss function is $Loss_{noise}(y_{noise}, \tilde{y}_{noise})$, where $y_{noise}$ is the noise speech training feature, and $\tilde{y}_{noise}$ is the noise speech label.

The second loss function $Loss_{clean}$ and the third loss function $Loss_{noise}(y_{noise}, \tilde{y}_{noise})$ are the mask inference loss function.

(5.4) The computer device constructs a target loss function of the preset enhancement network according to the first loss function, the second loss function, and the third loss function, and performs the noise removal training and the reverberation removal training on the preset enhancement network step by step according to the target loss function until the preset enhancement network meets the preset condition.

For example, the computer device may construct a target loss function Loss of the preset enhancement network according to the first loss function $Loss_{dc}$, the second loss function $Loss_{clean}$, and the third loss function $Loss_{noise}$, and may perform weighted summation on the three loss functions by using weight parameters respectively corresponding to the three loss functions, as the following formula:

$$Loss = \alpha Loss_{dc}(y_{dc}, \tilde{y}_{dc}) + \beta Loss_{clean}(y_{clean}, \tilde{y}_{clean}) + \gamma Loss_{noise}(y_{noise}, \tilde{y}_{noise})$$

α, β, and γ are weight parameters. The target loss function Loss performs the noise removal training and the reverberation removal training step by step on the preset enhancement network until the preset enhancement network meets the preset condition. In some aspects, training may be performed on the preset enhancement network based on multi-task learning, to learn two enhancement tasks of denoising and dereverberation at the same time by using the deep clustering loss function and the mask inference loss function. The two tasks may share information learned in a learning process by sharing parameters, so that the target enhancement network obtained through training achieves a better generalization effect.

Generally, noise refers to "unwanted sound" in some occasions, for example, a din of human and various sudden sounds. Reverberation refers to a phenomenon of sound continuation that still exists after an indoor sound source stops emitting sound. Considering that different application scenarios require different directions for speech enhancement, for example, mainly removing noise from sound acquired by a conference terminal in a multi-people conference, and mainly removing reverberation from sound acquired by a recording device in a professional recording venue, step training may be performed in different manners according to an actual scenario in which the final speech enhancement model is used.

In some aspects, an application scenario attribute may be obtained according to the actual scenario in which the final speech enhancement model is used, and a corresponding distributed training policy is determined according to the application scenario attribute. The target loss function of the preset enhancement network is constructed based on the distributed training policy and according to the first loss function, the second loss function, and the third loss function, and the noise removal training and the reverberation removal training are performed on the preset enhancement network step by step according to the target loss function until the preset enhancement network meets the preset condition.

The application scenario attribute is configured for indicating an actual scenario in which the speech enhancement model is used, for example, an attribute focusing on a denoising scenario or an attribute focusing on a dereverberation scenario. The distributed training policy includes a first distributed training policy and a second distributed training policy. The first distributed training policy is configured for focusing on a denoising scenario, where the noise removal training is first performed, and then the reverberation removal training is performed. The second distributed training policy is configured for focusing on a dereverberation scenario, where the reverberation removal training is first performed, and then the noise removal training is performed.

In an implementation, in an application scenario in which an object is to remove noise, for example, in a multi-people video conference, in addition to sound generated by a speaker, a conference terminal also acquires sound of another person, and denoising processing needs to be performed on a call speech acquired by the conference terminal. Therefore, the noise removal training may be first performed, and then the reverberation removal training is performed. The computer device may determine the target loss function of the preset enhancement network based on the first distributed training policy and according to the first loss function, the second loss function, and the third loss function, where the second loss function is determined by the noise removal loss function; and then iteratively perform the noise removal training on the preset enhancement network according to the target loss function until the preset enhancement network meets the preset condition, to obtain a noise removal network. The noise removal network is for denoising.

In some aspects, the computer device may determine a target loss function of the noise removal network according to the first loss function, the second loss function, and the third loss function, where the second loss function is determined by the reverberation removal loss function; and then iteratively perform the reverberation removal training on the noise removal network according to the target loss function until the noise removal network meets the preset condition. In this way, separate noise removal training is first performed, to avoid interference of a reverberation factor in a training process, so that the generated target enhancement network has better denoising performance.

In another implementation, in an application scenario in which an objective is to remove reverberation, for example, in a recording studio, sound quality requirement is relatively high, and it is important to remove unwanted reverberation. In this case, the reverberation removal training may be first performed, and then the noise removal training is performed. The computer device may determine the target loss function of the preset enhancement network based on the second distributed training policy and according to the first loss function, the second loss function, and the third loss function, where the second loss function is determined by the reverberation removal loss function; and then iteratively perform the reverberation removal training on the preset enhancement network according to the target loss function until the preset enhancement network meets the preset condition, to obtain a reverberation removal network. The reverberation removal network is for dereverberation.

In some aspects, the computer device may determine a target loss function of the reverberation removal network according to the first loss function, the second loss function, and the third loss function, where the second loss function being determined by the noise removal loss function; and then iteratively perform the noise removal training on the reverberation removal network according to the target loss function until the reverberation removal network meets the preset condition. In this way, separate reverberation removal training is first performed, to avoid interference of a noise factor in a training process, so that the generated target enhancement network has better dereverberation performance.

For example, when noise is accurately defined, a concept of noise essentially includes reverberation. Therefore, when there is no special requirement for an application scenario of the speech enhancement model, the noise removal training may be first performed on the preset enhancement network, and then the reverberation removal training is performed, so that a capability of dereverberation is further learned based on an excellent denoising network. In this way, an optimal training effect can be achieved in both training processes, so that the performance of the speech enhancement model performing speech enhancement is improved.

The preset condition may be: a total loss value of the target loss function is less than a preset value, a total loss value of the target loss function no longer changes, or a number of training times reaches a preset number. For example, an optimizer may be used to optimize the target loss function, and a learning rate, a batch size during training, and an epoch of training are set based on experimental experience.

It may be understood that after a plurality of epochs of iterative training are performed on a to-be-trained network (the preset enhancement network/the noise removal network/the reverberation removal network) according to the training sample set, where each epoch includes a plurality of times of iterative training, a parameter of the to-be-trained network is continuously optimized, and the total loss value is increasingly small and is finally reduced to a fixed value or less than the preset value. In this case, it represents that the to-be-trained network converges. Certainly, it may alternatively be determined that the preset enhancement network/the noise removal network/the reverberation removal network converges after the number of training times reaches the preset number.

Although training of the preset enhancement network through multi-task learning uses a combination of a deep clustering loss and a mask inference loss, the mask inference loss is used in a validation process of selection of the target enhancement network, that is, the speech enhancement model. When the speech enhancement model runs, an output of a mask inference branch is used as a mask after speech enhancement, that is, the target speech feature.

Step S240: The computer device obtains an initial speech feature of a call speech.

Step S250: The computer device inputs the initial speech feature to a hidden layer, to generate an intermediate feature through the hidden layer.

Step S260: The computer device inputs the intermediate feature to a speech mask inference layer, to generate a clean speech feature through the speech mask inference layer, and uses the clean speech feature as a target speech feature.

In an implementation, after acquiring a call speech, the computer device may perform speech feature extraction on the call speech, including performing framing processing, windowing framing, and Fourier transform on the call speech, to obtain an initial speech feature. The computer device may input the initial speech feature to the hidden layer of the speech enhance network, to generate an intermediate feature through the hidden layer. The computer device may input the intermediate feature to the speech mask inference layer, to generate a clean speech feature through the speech mask inference layer, and use the clean speech feature as a target speech feature.

Step S270: The computer device performs feature inverse transformation on the target speech feature, to calculate a target speech without noise and reverberation.

In an implementation, after obtaining the target speech feature, the computer device may perform feature inverse transformation on the target speech feature, to transform the target speech feature (the mask) in a frequency domain space into the target speech in a time domain space. In some aspects, the feature inverse transformation may be Fourier inverse transform. In this aspect of this disclosure, the training sample set may be obtained, and the preset enhancement network may be obtained. The noise removal training and the reverberation removal training are performed on the preset enhancement network step by step through the training sample set until the preset enhancement network meets the preset condition. The trained target enhancement network is obtained as the speech enhancement model. The initial speech feature is inputted to the hidden layer, to generate the intermediate feature through the hidden layer, the intermediate feature is inputted to the speech mask inference layer, to generate the clean speech feature through the speech mask inference layer, the clean speech feature is used as the target speech feature, and feature inverse transformation is performed on the target speech feature, to calculate the target speech without noise and reverberation. Therefore, the target speech feature outputted by the speech mask inference layer of the speech enhancement model needs to be used to restore a speech, so that an increase in a calculation amount in a speech enhancement process is avoided, and efficiency of speech enhancement is improved.

Figure 9:
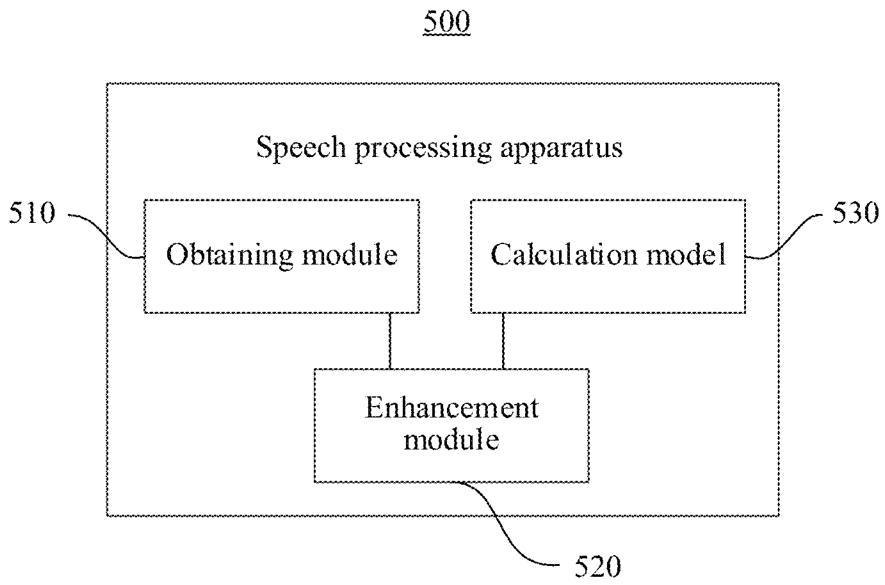
FIG. 9 is a modular block diagram of a speech processing apparatus according to an aspect of this disclosure.

FIG. 9 is a modular block diagram of a speech processing apparatus 500 according to an aspect of this disclosure. The speech processing apparatus 500 includes: an obtaining module 510, configured to obtain an initial speech feature of a call speech; an enhancement module 520, configured to input the initial speech feature to a pre-trained speech enhancement model, to obtain a target speech feature outputted by the speech enhancement model, the speech enhancement model being obtained through step training based on a deep clustering loss function and a mask inference loss function; and a calculation model 530, configured to calculate a target speech without noise and reverberation according to the target speech feature.

In some aspects, the speech processing apparatus 500 may further include: a sample obtaining module, a network obtaining module, and a model training module. The sample obtaining module is configured to obtain a training sample set, the training sample set including a noise speech feature, a clean speech label, a noise speech label, and a deep clustering annotation. The network obtaining module is configured to obtain a preset enhancement network, the preset enhancement network including a hidden layer, a deep clustering layer, and a mask inference layer. The network training module is configured to perform noise removal training and reverberation removal training on the preset enhancement network step by step by using the training sample set until the preset enhancement network meets a preset condition, and use a trained target enhancement network as the speech enhancement model.

In some aspects, the mask inference layer includes the speech mask inference layer and the noise mask inference layer. The network training module may include: a hiding unit, configured to input the noise speech feature to the hidden layer, to generate an intermediate training feature through the hidden layer; a deep clustering unit, configured to input the intermediate training feature to the deep clustering layer, to generate a clustering training annotation through the deep clustering layer; a speech inference unit, configured to input the intermediate training feature to the speech mask inference layer, to generate a clean speech training feature through the speech mask inference layer; a noise inference unit, configured to input the intermediate training feature to the noise mask inference layer, to generate a noise speech training feature through the noise mask inference layer; and a network training unit, configured to construct a target loss function according to the clean speech label, the noise speech label, the deep clustering annotation, the clean speech training feature, the noise speech training feature, and the clustering training annotation, and perform the noise removal training and the reverberation removal training on the preset enhancement network step by step according to the target loss function until the preset enhancement network meets the preset condition.

In some aspects, the network training unit includes: a first subunit, configured to determine a first loss function according to the clustering training annotation and the deep clustering annotation; a second subunit, configured to determine a second loss function according to the clean speech training feature and the clean speech label; a third subunit, configured to determine a third loss function according to the noise speech training feature and the noise speech label; and a training subunit, configured to construct a target loss function of the preset enhancement network according to the first loss function, the second loss function, and the third loss function, and perform the noise removal training and the reverberation removal training on the preset enhancement network step by step according to the target loss function until the preset enhancement network meets the preset condition.

In some aspects, the second subunit may be specifically configured to: determine a noise removal loss function according to the clean speech training feature and the first clean speech label; and use the noise removal loss function as the second loss function, where the first clean speech label is a speech label obtained based on a speech without noise and with reverberation.

In some aspects, the second subunit may further be specifically configured to: determine a reverberation removal loss function according to the clean speech training feature and the second clean speech label; and use the reverberation removal loss function as the second loss function, where the second clean speech label is a speech label obtained based on a speech without noise and reverberation.

In some aspects, the training subunit may be specifically configured to: determine the target loss function of the preset enhancement network according to the first loss function, the second loss function, and the third loss function, and iteratively perform the noise removal training on the preset enhancement network according to the target loss function until the preset enhancement network meets the preset condition, to obtain a noise removal network, where the second loss function is determined by the noise removal loss function; and determine a target loss function of the noise removal network according to the first loss function, the reverberation removal loss function, and the third loss function, and iteratively perform the reverberation removal training on the noise removal network according to the target loss function until the noise removal network meets the preset condition, where the second loss function is determined by the reverberation removal loss function.

In some aspects, the training subunit may be specifically configured to: determine the target loss function of the preset enhancement network according to the first loss function, the second loss function, and the third loss function, and iteratively perform the reverberation removal training on the preset enhancement network according to the target loss function until the preset enhancement network meets the preset condition, to obtain a reverberation removal network, where the second loss function is determined by the reverberation removal loss function; and determine a target loss function of the reverberation removal network according to the first loss function, the second loss function, and the third loss function, and iteratively perform the noise removal training on the reverberation removal network according to the target loss function until the reverberation removal network meets the preset condition, where the second loss function is determined by the noise removal loss function.

In some aspects, the sample obtaining module may be specifically configured to: obtain a first sample speech, where the first sample speech is a speech with noise and reverberation that is acquired based on a microphone; perform speech feature extraction on the first sample speech, to obtain a noise speech feature; obtain a second sample speech, where the second sample speech includes a clean speech without noise and with reverberation and a clean speech without noise and reverberation; perform speech feature extraction on the second sample speech, to obtain a first clean speech label and a second clean speech label; and determine the deep clustering annotation according to the first sample speech and the second sample speech.

In some aspects, the speech enhancement model includes the hidden layer, the deep clustering layer, the speech mask inference layer, and the noise mask inference layer. The enhancement module 520 may be specifically configured to: input the initial speech feature to a hidden layer, to generate an intermediate feature through the hidden layer; and input the intermediate feature to a speech mask inference layer, to generate a clean speech feature through the speech mask inference layer, and uses the clean speech feature as a target speech feature.

The calculation model 530 may be specifically configured to perform feature inverse transformation on the target speech feature, to calculate the target speech without noise and reverberation.

A person skilled in the art may understand that, for simple and clear description, for specific work processes of the foregoing described apparatus, and module, reference may be made to corresponding process in the foregoing method, and details are not described herein again.

In several aspects provided in this disclosure, coupling between modules may be electrical coupling, mechanical coupling, or other forms of coupling.

In addition, functional modules in the aspects of this disclosure may be integrated into one processing module, or each of the modules may exist alone physically, or two or more modules may be integrated into one module. The integrated module may be implemented in the form of hardware, or may be implemented in the form of a software functional module.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

In the solutions provided in this disclosure, the initial speech feature of the call speech may be obtained, and the initial speech feature is inputted to the pre-trained speech enhancement model, to obtain the target speech feature outputted by the speech enhancement model. The speech enhancement model is obtained through step training based on the deep clustering loss function and the mask inference loss function. The target speech without noise and reverberation is calculated according to the target speech feature. Therefore, different loss functions are used to perform model training on the preset speech enhancement model, and the model is guided to efficiently remove noise and reverberation in the speech. While computing resources of a model are reduced, the performance of speech enhancement is improved.

Figure 10:
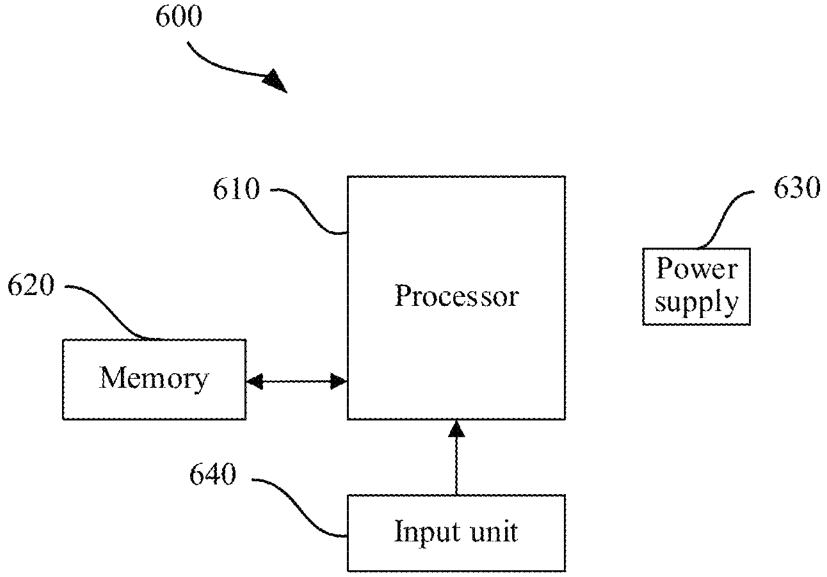
FIG. 10 is a modular block diagram of a computer device according to an aspect of this disclosure.

As shown in FIG. 10, an aspect of this disclosure further provides a computer device 600. The computer device 600 includes a processor 610 and a memory 620, a power supply 630, and an input unit 640. The memory 620 stores computer program instructions. The computer program instructions, when invoked by the processor 610, may perform method steps provided in the foregoing examples. A person skilled in the art may understand that, the structure of the computer device shown in the figure does not constitute a limitation to the computer device. The computer device may include components that are more or fewer than those shown in the figure, or some components may be combined, or a different component deployment may be used.

Processing circuitry, such as the processor 610, may include one or more processing cores. The processor 610 connects various parts of the entire battery management system by using various interfaces and lines. By running or executing instructions, a program, a code set, or an instruction set stored in the memory 620 and invoking data stored in the memory 620, the processor 610 executes various functions of the battery management system and processes data, and executes various functions of the computer device and processes data, to perform overall control of the computer device. In some aspects, the processor 610 may be implemented by using at least one hardware form of a digital signal processor (DSP), a field-programmable gate array (FPGA), and a programmable logic array (PLA). The processor 610 may integrate one or a combination of a central processing unit 610 (CPU), a graphics processing unit 610 (GPU), a modem, and the like. The CPU mainly processes an operating system, a user interface, an application program, and the like. The GPU is configured to be responsible for rendering and drawing content. The modem is mainly configured to process wireless communication. It may be understood that the modem may not be integrated into the processor 610, and is implemented by using a communication chip separately.

The memory 620 may include a random access memory 620 (RAM), or may include a read-only memory 620. The memory 620 may be configured to store instructions, a program, code, a code set, or an instruction set. The memory 620 may include a program storage area and a data storage area. The program storage area may store instructions configured for implementing an operating system, instructions configured for implementing at least one function (such as a touch function, a sound playback function, and an image playback function), instructions configured for implementing the following various method examples, and the like. The data storage area may also store data (such as an address book and audio and video data) created in use of the computer device. Correspondingly, the memory 620 may further include a memory controller, so that the processor 610 can access the memory 620.

The power supply 630 may be logically connected to the processor 610 by using a power management system, thereby implementing functions such as charging, discharging, and power consumption management by using the power management system. The power supply 630 may further include one or more direct current or alternating current power supplies, a re-charging system, a power failure detection circuit, a power supply converter or inverter, a power supply state indicator, and any other component.

The input unit 640 may be configured to receive entered numeric or character information and generate keyboard, mouse, joystick, optical, or trackball signal input related to user settings and function control.

Although not shown in the figure, the computer device 600 may further include a display unit, and the like. Details are not described herein again. Specifically, in an aspect of this disclosure, the processor 610 in the computer device may load executable files corresponding to processes of one or more application programs to the memory 620 according to the following instructions, and the processor 610 executes the application programs stored in the memory 620, to implement various method steps provided in the foregoing aspects.

Figure 11:
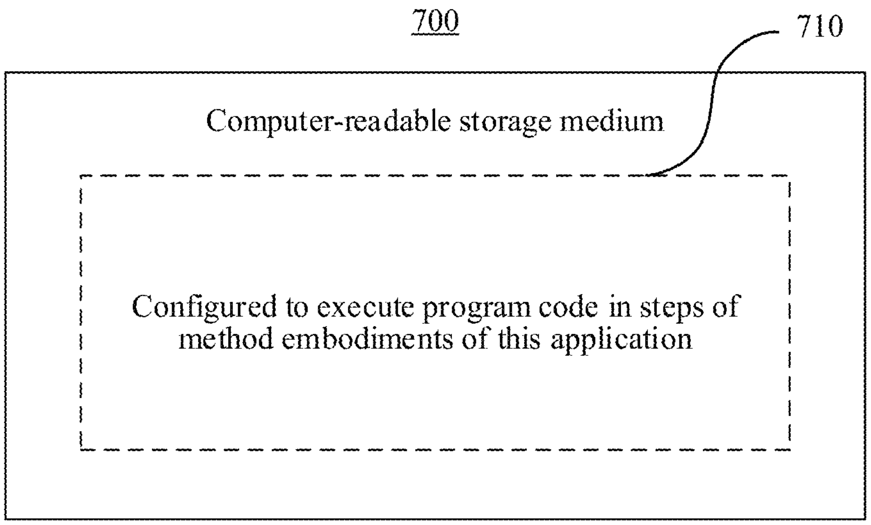
FIG. 11 is a modular block diagram of a computer-readable storage medium according to an aspect of this disclosure.

As shown in FIG. 11, an aspect of this disclosure further provides a computer-readable storage medium 700, such as a non-transitory computer-readable storage medium. The computer-readable storage medium 700 stores computer program instructions 710. The computer program instructions 710 may be invoked by a processor to perform the method described in the foregoing examples.

The computer-readable storage medium may be an electronic memory such as a flash memory, an electrically erasable programmable read-only memory (EEPROM), an EPROM, a hard disk, or a ROM. In some aspects, the computer-readable storage medium includes a non-transitory computer-readable storage medium. The computer-readable storage medium 700 has a storage space of program code for performing any method step in the foregoing method. The program code may be read from one or more computer program products or be written to the one or more computer program products. The program code may be, for example, compressed in an appropriate form.

According to an aspect of this disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the method provided in the various implementations provided in the foregoing examples.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The above are merely examples of aspects of this disclosure, and are not intended to limit this disclosure in any form. The examples provided in the disclosure are not intended to limit this disclosure. A person skilled in the art can make some equivalent variations, alterations or modifications to the above-disclosed technical content without departing from the scope of the technical solutions of this disclosure to obtain equivalent examples. Other aspects, including variations of the aspects described herein, shall fall within the scope of the technical solutions of this disclosure.

What is claimed is:

1. An audio processing method comprising:

obtaining an initial audio feature of initial audio data;

inputting the initial audio feature to an audio enhancement model, the audio enhancement model being iteratively trained based on a training sample set, a deep clustering loss function of a clustering training annotation and a deep clustering annotation of the training sample set, and a mask inference loss function of (i) a clean audio training feature and a clean audio label of the training sample set and (ii) a noise audio training feature and a noise audio label of the training sample set;

calculating, by processing circuitry, target audio data with reduced noise and reverberation according to a target audio feature, the target audio feature being generated by the audio enhancement model based on the initial audio feature; and outputting the target audio data.

2. The audio processing method according to claim 1, further comprises:

obtaining the training sample set that includes a noise audio feature, the clean audio label, the noise audio label, and the deep clustering annotation; and performing noise removal training and reverberation removal training on a preset enhancement network based on the training sample set to obtain the audio enhancement model when the preset enhancement network meets a preset condition.

3. The audio processing method according to claim 2, wherein the preset enhancement network further comprises:

a hidden layer,
a deep clustering layer, and
a mask inference layer, the mask inference layer including an audio mask inference layer and a noise mask inference layer.

4. The audio processing method according to claim 3, wherein the performing the noise removal training and the reverberation removal training on the preset enhancement network further comprises:

inputting the noise audio feature to the hidden layer, to generate an intermediate training feature through the hidden layer, inputting the intermediate training feature to the deep clustering layer, to generate the clustering training annotation through the deep clustering layer, inputting the intermediate training feature to the audio mask inference layer, to generate the clean audio training feature through the audio mask inference layer, inputting the intermediate training feature to the noise mask inference layer, to generate the noise audio training feature through the noise mask inference layer, and constructing a target loss function according to the clean audio label, the noise audio label, the deep clustering annotation, the clean audio training feature, the noise audio training feature, and the clustering training annotation; and the noise removal training and the reverberation removal training are performed on the preset enhancement network iteratively according to the target loss function until the preset enhancement network meets the preset condition.

5. The audio processing method according to claim 3, wherein the performing the noise removal training and the reverberation removal training on the preset enhancement network further comprises:

inputting the noise audio feature to the hidden layer, to generate an intermediate training feature through the hidden layer, inputting the intermediate training feature to the deep clustering layer, to generate the clustering training annotation through the deep clustering layer, inputting the intermediate training feature to the audio mask inference layer, to generate the clean audio training feature through the audio mask inference layer, inputting the intermediate training feature to the noise mask inference layer, to generate the noise audio training feature through the noise mask inference layer, determining a first loss function according to the clustering training annotation and the deep clustering annotation, determining a second loss function according to the clean audio training feature and the clean audio label, determining a third loss function according to the noise audio training feature and the noise audio label, and constructing a target loss function of the preset enhancement network according to the first loss function, the second loss function, and the third loss function; and the noise removal training and the reverberation removal training are performed on the preset enhancement network iteratively according to the target loss function until the preset enhancement network meets the preset condition.

6. The audio processing method according to claim 5, wherein the constructing the target loss function further comprises:

performing weighted summation on the first loss function, the second loss function, and the third loss function based on weight parameters to obtain the target loss function of the preset enhancement network.

7. The audio processing method according to claim 5, wherein the clean audio label includes a first clean audio label; and the determining the second loss function further comprises:

determining a noise removal loss function according to the clean audio training feature and the first clean audio label, and using the noise removal loss function as the second loss function, the first clean audio label is based on audio with reduced noise.

8. The audio processing method according to claim 5, wherein the clean audio label includes a second clean audio label; and the determining the second loss function further comprises:

determining a reverberation removal loss function according to the clean audio training feature and the second clean audio label, and using the reverberation removal loss function as the second loss function, the second clean audio label is with reduced reverberation.

9. The audio processing method according to claim 5 wherein the constructing the target loss function of the preset enhancement network further comprises:

obtaining an application scenario attribute;

determining a corresponding distributed training policy according to the application scenario attribute; and constructing the target loss function of the preset enhancement network based on the distributed training policy and according to the first loss function, the second loss function, and the third loss function.

10. The audio processing method according to claim 9, wherein the initial audio feature includes a speech feature.

11. The audio processing method according to claim 2, wherein the obtaining the training sample set further comprises:

obtaining a first sample speech with noise and reverberation that is acquired based on a microphone;

performing speech feature extraction on the first sample speech, to obtain a noise speech feature;

obtaining a second sample speech including a clean speech without noise and with reverberation and a clean speech without noise and reverberation;

performing speech feature extraction on the second sample speech, to obtain a first clean speech label and a second clean speech label; and determining the deep clustering annotation according to the first sample speech and the second sample speech.

12. The audio processing method according to claim 4, wherein the preset condition comprises at least one of:

a total loss value of the target loss function is less than a preset value, the total loss value of the target loss function no longer changes, or a number of training times of the audio enhancement model reaches a preset number.

13. The audio processing method according to claim 2, wherein the audio enhancement model further includes a hidden layer, a deep clustering layer, a speech mask inference layer, and a noise mask inference layer; and the performing the noise removal training and the reverberation removal training on the preset enhancement network further comprises:

inputting the initial audio feature to the hidden layer, to generate an intermediate feature through the hidden layer, and inputting the intermediate feature to the speech mask inference layer, to generate a clean speech feature through the speech mask inference layer, and using the clean speech feature as the target audio feature; and the calculating the target audio data with reduced noise and reverberation according to the target audio feature includes performing inverse transformation on the target audio feature.

14. An information processing apparatus, comprising:

processing circuitry configured to:

obtain an initial audio feature of initial audio data;

input the initial audio feature to an audio enhancement model, the audio enhancement model being iteratively trained based on a training sample set, a deep clustering loss function of a clustering training annotation and a deep clustering annotation of the training sample set, and a mask inference loss function of (i) a clean audio training feature and a clean audio label of the training sample set and (ii) a noise audio training feature and a noise audio label of the training sample set;

calculate target audio data with reduced noise and reverberation according to a target audio feature, the target audio feature being generated by the audio enhancement model based on the initial audio feature; and output the target audio data.

15. The apparatus according to claim 14, wherein the processing circuitry is configured to:

obtain the training sample set that includes a noise audio feature, the clean audio label, the noise audio label, and the deep clustering annotation; and perform noise removal training and reverberation removal training on a preset enhancement network based on the training sample set to obtain the audio enhancement model when the preset enhancement network meets a preset condition.

16. The apparatus according to claim 15, wherein the processing circuitry is configured to:

input the noise audio feature to a hidden layer of the preset enhancement network, to generate an intermediate training feature through the hidden layer;

input the intermediate training feature to a deep clustering layer of the preset enhancement network, to generate the clustering training annotation through the deep clustering layer;

input the intermediate training feature to an audio mask inference layer of the preset enhancement network, to generate the clean audio training feature through the audio mask inference layer;

input the intermediate training feature to a noise mask inference layer of the preset enhancement network, to generate the noise audio training feature through the noise mask inference layer;

construct a target loss function according to the clean audio label, the noise audio label, the deep clustering annotation, the clean audio training feature, the noise audio training feature, and the clustering training annotation; and perform the noise removal training and the reverberation removal training on the preset enhancement network iteratively according to the target loss function until the preset enhancement network meets the preset condition.

17. A non-transitory computer-readable storage medium, storing instructions which when executed by a processor cause the processor to perform:

obtaining an initial audio feature of initial audio data;

inputting the initial audio feature to an audio enhancement model, the audio enhancement model being iteratively trained based on a training sample set, a deep clustering loss function of a clustering training annotation and a deep clustering annotation of the training sample set, and a mask inference loss function of (i) a clean audio training feature and a clean audio label of the training sample set and (ii) a noise audio training feature and a noise audio label of the training sample set;

calculating target audio data with reduced noise and reverberation according to a target audio feature generated by the audio enhancement model based on the initial audio feature; and outputting the target audio data.

18. The non-transitory computer-readable storage medium according to claim 17, wherein the instructions when executed by the processor further cause the processor to perform:

obtaining the training sample set that includes a noise audio feature, the clean audio label, the noise audio label, and the deep clustering annotation; and performing noise removal training and reverberation removal training on a preset enhancement network based on the training sample set to obtain the audio enhancement model when the preset enhancement network meets a preset condition.

19. The non-transitory computer-readable storage medium according to claim 18, wherein the instructions when executed by the processor further cause the processor to perform:

inputting the noise audio feature to a hidden layer of the preset enhancement network, to generate an intermediate training feature through the hidden layer;

inputting the intermediate training feature to a deep clustering layer of the preset enhancement network, to generate the clustering training annotation through the deep clustering layer;

inputting the intermediate training feature to an audio mask inference layer of the preset enhancement network, to generate the clean audio training feature through the audio mask inference layer;

inputting the intermediate training feature to a noise mask inference layer of the preset enhancement network, to generate the noise audio training feature through the noise mask inference layer; and constructing a target loss function according to the clean audio label, the noise audio label, the deep clustering annotation, the clean audio training feature, the noise audio training feature, and the clustering training annotation; and performing the noise removal training and the reverberation removal training on the preset enhancement network iteratively according to the target loss function until the preset enhancement network meets the preset condition.

20. The non-transitory computer-readable storage medium according to claim 18, wherein the instructions when executed by the processor further cause the processor to perform:

inputting the noise audio feature to a hidden layer of the preset enhancement network, to generate an intermediate training feature through the hidden layer;

inputting the intermediate training feature to a deep clustering layer of the preset enhancement network, to generate the clustering training annotation through the deep clustering layer;

inputting the intermediate training feature to an audio mask inference layer of the preset enhancement network, to generate the clean audio training feature through the audio mask inference layer;

inputting the intermediate training feature to a noise mask inference layer of the preset enhancement network, to generate the noise audio training feature through the noise mask inference layer;

determining a first loss function according to the clustering training annotation and the deep clustering annotation;

determining a second loss function according to the clean audio training feature and the clean audio label;

determining a third loss function according to the noise audio training feature and the noise audio label;

constructing a target loss function of the preset enhancement network according to the first loss function, the second loss function, and the third loss function; and performing the noise removal training and the reverberation removal training on the preset enhancement network iteratively according to the target loss function until the preset enhancement network meets the preset condition.

* * * * *